United States Patent [19]

Brebant

[11] E Re. 28,524

[45] Reissued Aug. 19, 1975

[54] APPARATUS FOR TREATING A LIQUID WITH A GAS, NOTABLY FOR DEODORIZING EDIBLE OIL

[75] Inventor: Robert Brebant, Sainte-Mande, France

[73] Assignee: Chemetron Corporation, Chicago, Ill.

[22] Filed: June 8, 1972

[21] Appl. No.: 150,856

Related U.S. Patent Documents

Reissue of:

[64] Patent No.: 3,517,732
Issued: June 30, 1970
Appl. No.: 692,921
Filed: Dec. 22, 1967

[52] U.S. Cl. ..... 202/175; 165/108; 165/109; 202/205; 202/234; 203/92; 426/488; 99/483

[51] Int. Cl. ..... B01d 3/00; B01d 3/10

[58] Field of Search ..... 165/108, 109, 132, 169; 203/92, 94, 95, 96; 159/1 C, 16 S; 202/175, 205, 234; 23/275, 276; 426/488

[56] References Cited

UNITED STATES PATENTS

| | | | |
|---|---|---|---|
| 1,526,961 | 2/1925 | Burrows | 165/108 |
| 1,771,561 | 7/1930 | Gensecke | 203/92 X |
| 1,846,067 | 2/1932 | Sadtler | 165/105 |
| 2,042,711 | 6/1936 | Gensecke | 202/205 |
| 2,081,432 | 5/1937 | Hopgood | 165/108 |
| 2,091,013 | 8/1937 | Rawlins | 165/108 X |
| 2,163,303 | 6/1939 | Bonotto | 203/96 |
| 2,166,188 | 7/1939 | Turner | 165/169 X |
| 2,274,802 | 3/1942 | Mills | 159/1 C X |
| 2,289,953 | 7/1942 | Aldridge | 165/109 X |
| 2,695,868 | 11/1954 | Brucke | 203/92 X |
| 3,246,761 | 4/1966 | Bryan et al. | 165/108 X |
| 3,255,887 | 6/1966 | Walker et al. | 165/108 X |

FOREIGN PATENTS OR APPLICATIONS

| | | | |
|---|---|---|---|
| 512,512 | 11/1930 | Germany | |
| 477,024 | 3/1936 | United Kingdom | 159/1 C |
| 677,579 | 8/1952 | United Kingdom | 165/108 |
| 1,079,592 | 4/1960 | Germany | |

*Primary Examiner*—Albert W. Davis, Jr.
*Attorney, Agent, or Firm*—Mason, Kolehmainen, Rathburn & Wyss

[57] ABSTRACT

Apparatus for treating a liquid with a gas, in particular for deodorizing edible oil, comprises a vessel, pipe lines for introducing into the vessel a certain quantity of liquid to be treated and for discharging treated liquid from the vessel and a vertically extending chimney open at its bottom and top ends and positioned in the vessel with its bottom end near the bottom of the vessel and its top end extending above the liquid level in the vessel. A steam injector discharges into the chimney to heat the liquid and produce strong upward flow of liquid in the chimney. By a deflecting baffle spaced above the top of the chimney and having a diameter greater than the chimney, the liquid discharged from the top of the chimney is directed outwardly and downwardly over the surface of liquid in the vessel. The chimney preferably has a hollow wall in which a temperature fluid is circulated.

9 Claims, 5 Drawing Figures

APPARATUS FOR TREATING A LIQUID WITH A GAS, NOTABLY FOR DEODORIZING EDIBLE OIL

Matter enclosed in heavy brackets [ ] appears in the original patent but forms no part of this reissue specification; matter printed in italics indicates the additions made by reissue.

BACKGROUND OF THE INVENTION

This invention relates to an apparatus for treating a liquid with a gas, notably for deodorizing edible oil.

It is current practice to effect the continuous deodorization of edible oils by using large-capacity vessels in which the oil is heated at a relatively high temperature, of the order of 180° to 250° C. (356° to 482° F.) and subsequently submitted to a water steam injection during a time ranging from about one hour to several hours. This oil is then cooled at least partially in the same vessel and eventually another batch of oil to be treated is substituted therefor and subjected to the same processing cycle.

The necessity of heating large quantities of oil in the shortest possible time and subsequently cooling the batch when the steam injection has become sufficient leads to equipping the inner space of the vessels with considerable lengths of coils of metal piping through which either water steam or other high-temperature heating media, such as special mineral oils, are circulated, in alternation with cooling water.

Since the heating and cooling time periods are idle periods it is advantageous to reduce them as much as possible and therefore to use the greatest possible heat-transfer surface areas, this requirement being usually met by equipping the vessels with extremely long coil piping forming either a plurality of rows of concentric turns or separate coils distributed all over the inner space of the vessel.

Moreover, these known apparatus are equipped with one or more chimneys serving the purpose of creating a certain turbulence or circulation of the oil mass to promote its contact with the steam. In fact, the steam injected into this chimney will create therein a relatively fast upward oil stream conveying to the surface the oil lying in the bottom of the vessel.

Under these conditions it is clear that the presence in such vessels of coils constituting as many barriers or screens is objectionable from the point of view of this desired circulation, inasmuch as the heating maintained during the steam injection creates in the vicinity of the turns of each coil of piping an upward oil stream counteracting this circulation.

On the other hand, the oil tends to stagnate between the coil turns, thus creating zones of lesser or even zero contact between the oil and the steam. This makes it necessary to extend considerably the reaction time and tends to promote local overheating.

SUMMARY OF THE INVENTION

It is the essential object of this invention to avoid the inconveniences characterizing known apparatus of this character.

To this end, the apparatus according to this invention for treating a liquid with a gas, notably for deodorizing edible oil, which comprises a vessel, pipe lines for introducing into said vessel and discharging therefrom a certain quantity of liquid to be treated, at least one steam injector immersed in the liquid adjacent the bottom of said vessel, and at least one chimney also immersed in the liquid mass and disposed above said steam injector, is characterized in that the wall of said chimney and possibly the wall of said vessel are hollow and that means are provided for circulating within said walls a heating or cooling medium, whereby said walls themselves act as heat transfer devices.

The apparatus according to this invention is advantageous in that it is free of heating and/or cooling coil piping systems immersed in the oil or other liquid to be treated, so that the closed-circuit streams produced in the liquid are not impaired by the presence of any obstacle whatsoever. On the other hand, any dead zones wherein the liquid might tend to indulge or stagnate is definitely avoided. As a result, the efficiency of the deodorizing process is greatly improved and the reaction time can be reduced to a substantial degree.

According to another feature of this invention the chimney is partially immersed in the liquid bath contained in the vessel and its upper end emerges, in relation to the liquid bath level, by a height ranging from one-tenth to one-twentieth of the total height of the chimney.

This arrangement is particularly advantageous in that it improves the oil deodorizing process since the oil is carried along in the chimney by the steam injected into the lower portion thereof, up to a level somewhat higher than the liquid level, whereby the oil will fall laterally back into the bath in a vacuumized space.

According to a further feature characterizing this invention, the inner diameter of the chimney ranges from one third to one fourth of the inner diameter of the vessel. This dimensional range ensures an optimum upward liquid output rate within the chimney; it is attended by a substantial improvement in the liquid circulation and therefore by an optimum efficiency.

According to a complementary feature of this invention the output cross-sectional area available between the upper edge of the chimney and the outer edge of the baffle means overlying the chimney outlet is greater than twice the inner surface area of the chimney. Thus, the liquid emerging from the top of the chimney is not retarded before it falls back into the underlying bath.

The apparatus according to this invention is also applicable to treatments other than the deodorization of a liquid; thus, a typical use of this apparatus is the hydrogenation of various products. In this case, the injection device immersed in the liquid mass is caused to inject a gaseous fluid which, in the case of hydrogenation, consists of course of hydrogen.

BRIEF DESCRIPTION OF THE DRAWINGS

Various forms of embodiment of the apparatus constituting the subject-matter of this invention will now be described by way of example with reference to the accompanying drawing, in which.

DESCRIPTION OF THE PREFERRED EMBODIMENT

Figure 1:
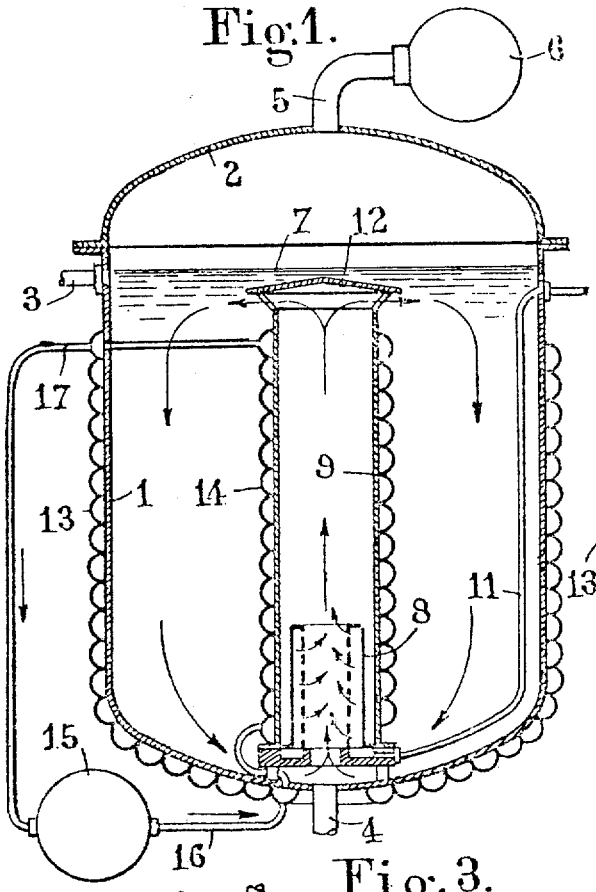
FIG. 1 is a vertical axial section showing an apparatus for deodorizing edible oil, constructed according to the teachings of this invention.

The apparatus illustrated in FIG. 1 comprises essentially a vessel consisting of a vat 1 closed at its top by a cover 2. The vat 1 of this example contains a certain quantity of oil which is fed thereto via an inlet pipeline 3 and adapted to be discharged, subsequent to the deodorizing process, through an outlet pipeline 4 connected to the bottom of the vat 1.

Opening into the cover 2 is a duct 5 connected to a vacuum pump 6 for the purpose of creating within the vat, above the oil level 7, a certain vacuum for example of the order of 1 to 10 torrs (1 to 10 mm./Hg). Mounted coaxially in the vat 1 is an immersed assembly comprising a steam injector 8 surrounded by a chimney-forming cylindrical body 9, this assembly being supported by the bottom of the vat 1. The steam injector 8 is connected to a steam supply line 11 extending through the wall of the vat and leading from a suitable steam source (not shown). The steam injector 8 may be of any known and suitable type, as currently used in conventional apparatus.

The chimney 9 extending well above the steam injector 8 carries at its top a baffle 12.

According to this invention the walls of the vat 1 and chimney 9 of the deodorizing apparatus are hollow to permit the circulation within these walls either of a heating fluid or of a cooling fluid. Thus, their surfaces act as heat transfer means.

Various forms of embodiment of the walls of vat 1 and chimney 9 may be devised without departing from the spirit and scope of this invention. In FIG. 1, it will be seen that the wall of vat 1 consists of a helical duct insert of semi-circular, elliptical, square, rectangular or other cross-sectional contour, with abutting or spaced turns. This duct of coil covers nearly the entire height of the vertical wall of the vat 1 and also the bottom thereof.

According to a modified form of embodiment, the coil 13 may also be replaced by a shell surrounding the outer surface of the wall of the vat 1 to form therewith an enclosure in which the heating or cooling fluid is circulated.

Similarly, the wall of chimney 9 consists of a coil 14 having abutting turns. These coils 13 and 14 are connected either separately or in parallel to a heating (or cooling) circuit comprising a heating (or cooling) fluid generator 15, a heating (or cooling) feed duct 16 and a fluid return duct 17. These ducts are connected to the endmost turns of the coils 13 and 14 provided on the walls of vat 1 and chimney 9.

According to a modified form of embodiment, the walls of the vat 1 and chimney 9 may be provided with a pair of coaxial imbricated coil piping systems for the heating fluid circulation and the cooling fluid circulation respectively, these coils being connected to suitable generators.

Of course, the heating coil of vat 1 may be supplied with hot fluid while cooling fluid is being delivered to the cooling coil of chimney 9, and vice versa. Thus, the liquid circulation may be improved at will within the vat 1.

In the specific form of embodiment illustrated in FIG. 1 the coils 13 and 14 are shown as having a semicircular cross-sectional configuration. These coils are secured respectively to the outer surfaces of the vat 1 and chimney 9, so as to constitute helical duct means through which the heating or cooling fluid is caused to flow.

During the deodorizing process, while steam under pressure is being injected by the device 8 into the lower portion of the chimney 9, an ascending stream develops in this chimney which consists of oil and steam, as shown by the arrows. The baffle 12 disposed above the upper edge of the chimney 9 is adapted to deflect this stream laterally towards the lateral walls of vat 1.

In FIG. 1 it will be seen that a descending oil stream is produced within the annular space between the chimney 9 and the inner wall of vat 1; consequently, the oil follows a closed-circuit path about the chimney 9. Due to the fact that the heating coils 13 and 14 are carried by the walls of vat 1 and chimney 9, it is obvious that nothing interferes with the building up of this oil stream by convection, so that the stirring and therefore the efficiency of the deodorizing process are greatly improved.

Besides, any dead zone is definitely precluded in the liquid flow.

Figure 2:
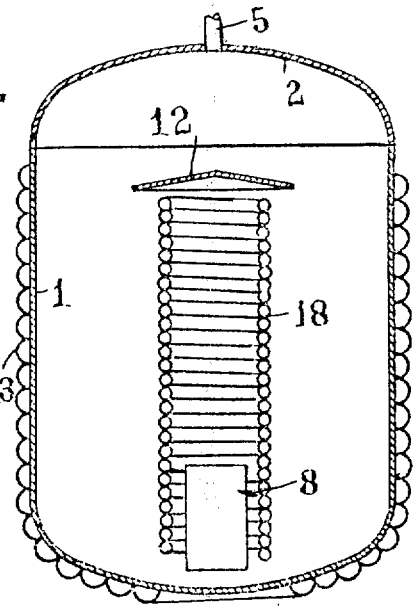
FIGS. 2, 3, 4 and 5 are diagrams showing different modified forms of embodiment of the apparatus of this invention.

The heating walls of the vat 1 and chimney 9 may be designed in many different ways without departing from the basic principles of this invention. Thus, FIG. 2 illustrates diagrammatically a chimney consisting throughout its height of a single coil 18 having abutting turns of circular cross-sectional contour, and the wall of the vat 1 is constructed like the one shown in FIG. 1.

Figure 3:
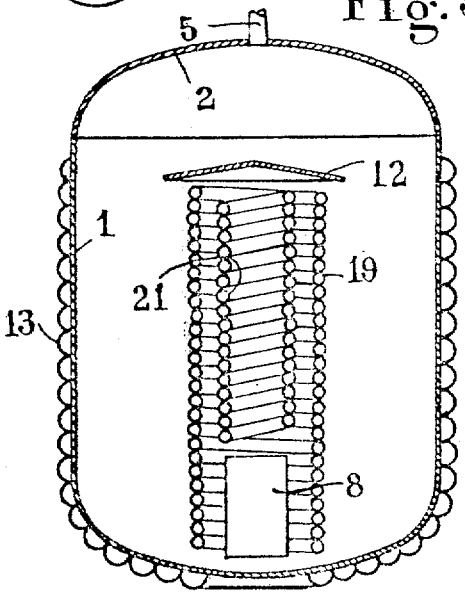

In the alternate form of embodiment illustrated in FIG. 3, the chimney consists of a pair of coaxial coils, namely an outer coil 19 and an inner coil 21 shorter than the former and disposed above the steam injection device.

Figure 4:
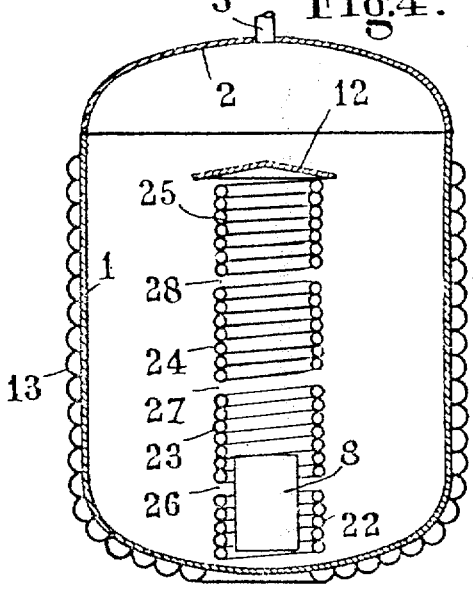

In another form of embodiment illustrated diagrammatically in FIG. 4 the chimney is made up of a plurality of superposed coil sections, namely elementary coil sections 22, 23, 24 and 25. Each coil section has abutting turns, and gaps 26, 27 and 28 are provided between the coil sections, as shown. Thus, the oil circulation and recycling are considerably improved, and the heat transfer is also more efficient.

Figure 5:
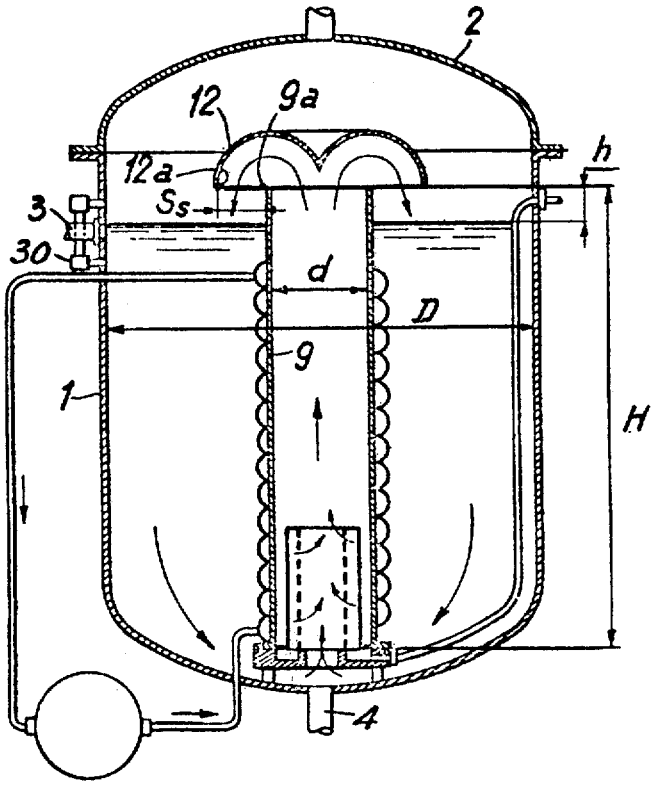

The apparatus illustrated in FIG. 5 comprises essentially the same component elements as those of the above-described apparatus, these elements being designated by the same reference numerals.

The apparatus shown in FIG. 5 comprises a vat 1 for holding the oil or other liquid to be treated. The vat is provided with an inlet pipe 3 for introducing liquid into the vat to fill it to a selected liquid level as determined by any suitable means, for example by a conventional sight glass 30. An outlet pipeline 4 is connected to the bottom of the vat for discharging the processed liquid from the vat.

As clearly shown in the figure, the chimney 9 emerges above the level of the liquid bath contained in the vat 1.

If H is the total height of the chimney 9 and h the height of the chimney portion emerging above the level of the liquid bath, it has been found that the height h should comply with the relationship $H/20<h<H/10$ in order to obtain a satisfactory efficiency in the deodorizing process.

Besides, it was also found that the inner diameter d of chimney 9 and the inner diameter D of vat should comply with the following relationship $\frac{1}{4}<d/D<\frac{1}{3}$ in order to obtain a satisfactory and considerable liquid output through the chimney and therefore improve the efficiency of the deodorizing process.

Similarly, the cross-sectional dimensions of the outlet $S_s$ measured between the outer edge 12a of baffle 12 and the upper edge 9a of chimney 9 should be greater than twice the inner surface area of chimney 9, or, otherwise stated:

$$S_s > 2\times \frac{\pi d^2}{4}, \text{ i.e. } S_s > \frac{\pi d^2}{2}$$

By calculating the outlet cross-sectional area, $S_s$ according to this relationship the liquid area not be unduly retarded at the top of the chimney and therefore a satisfactory output can be obtained within this chimney.

A typical example of dimensional factors utilized in a practical form of actuation of an apparatus constructed according to the structure shown in FIG. 5 of the attached drawing will now be described.

This apparatus, adapted to process a 15-ton batch of edible oil for deodorizing same, comprises a vat 1 having an internal diameter of 100″, the total height of the vat and cover 2 being 13′9″. The height H of the chimney 9 is 13′ and its inner diameter is 26⅜″. In this apparatus the oil level is maintained about 8 to 16 inches below the top edge of the chimney.

With this apparatus the time necessary for heating and cooling the liquid bath was reduced by at least 50% in comparison with conventional apparatus.

While the invention has been described and illustrated in its preferred embodiments, it should be understood that the invention is not to be limited to the precise details herein illustrated and described since the same may be carried out in other ways falling within the scope of the invention as claimed.

What I claim is:

1. An apparatus for processing a liquid by means of a gas, notably for deodorizing edible oil, comprising a vessel for containing said liquid, *said vessel being connected to a source of vacuum*, pipe line means for introducing liquid into said vessel to fill said vessel to a selected liquid level and means for discharging processed liquid from said vessel, at least one vertically extending chimney open at its bottom and top ends and *centrally* positioned in said vessel and extending upwardly from near the bottom of said vessel to above said liquid level, said chimney having a cross sectional area which is a minor part of the cross sectional area of said vessel, *said chim- a plurality of coaxial turns of coiled tubing, said tubing having a circular cross section and said turns in abutting relation to one another, means connected to said tubing at the bottom of said chimney for supplying to and circulating in said hollow wall to said top of said chimney a fluid at a temperature other than that of said liquid whereby said hollow wall constitutes heat transfer means*, at least one steam injector immersed in said liquid and discharging in said chimney to produce upward flow of liquid in said chimney, said liquid being drawn into the bottom end of said chimney and discharged from the top end of said chimney, and deflecting baffle means spaced above the top end of said chimney, said baffle means being of a diameter substantially greater than said chimney and having a peripheral surface portion which extends radially outwardly beyond said chimney outwardly and downwardly liquid discharged from the top end of said chimney.

[2. An apparatus as set forth in claim 1, wherein said chimney has a hollow wall, and wherein means is provided for supplying to and circulating in said hollow wall a fluid at a temperature other than that of said liquid, whereby said hollow wall constitutes heat transfer means.]

3. An apparatus as set forth in claim 1 wherein the top portion of said chimney emerges above the liquid level by a height ranging from one-tenth to one-twentieth of the total height of said chimney.

4. An apparatus as set forth in claim 1, wherein the inner diameter of said chimney ranges from about one-third to about one-fourth of the inner diameter of said vessel.

5. An apparatus as set forth in claim 1, wherein the cross-sectional area of the outlet passage of said chimney, as measured between the top edge of the chimney and the outer edge of said baffle overlying the chimney top, is greater than twice the internal cross-sectional area of the chimney.

[6. An apparatus for processing a liquid by means of a gas notably for deodorizing edible oil, comprising a vessel for containing said liquid, pipeline means for introducing liquid into said vessel to fill said vessel to a selected liquid level and means for discharging processed liquid from said vessel, at least one vertically extending cylindrical chimney open at its bottom and top ends and positioned in said vessel and extending upwardly from near the bottom of said vessel to above said liquid level, said chimney having a cross sectional area which is a minor part of the cross sectional area of said vessel, at least one steam injector immersed in said liquid and discharging in said chimney to produce upward flow of liquid in said chimney, said liquid being drawn into the bottom end of said chimney and discharged from the top end of said chimney, and deflecting baffle means spaced above the top end of said chimney to direct outwardly and downwardly liquid discharged from the top end of said chimney, the top portion of said chimney emerging above the liquid level by a height ranging from one-tenth to one-twentieth of the total height of said chimney.]

[7. An apparatus as set forth in claim 6, wherein the inner diameter of said chimney ranges from about one-third to about one-quarter the inner diameter of said vessel.]

[8. An apparatus as set forth in claim 6, wherein said baffle has a cross sectional shape comprising a central inverted peak and portions curving first upwardly from said peak and then outwardly and downwardly.]

*9. An apparatus as set forth in claim 1, wherein said chimney comprises a pair of coaxial coil, metal pipings in which said fluid at a temperature other than of said liquid is circulated.*

*10. An apparatus as set forth in claim 1, wherein said chimney comprises coil sections having abutting turns, said fluid at a temperature other than that of said liquid being caused to flow through said coil sections, said coil sections being connected in series with one another ana separated by gaps permitting the passage of said liquia therethrough.*

*11. An apparatus for processing a liquid by means of a gas, notably for deodorizing edible oil, comprising a vessel for containing said liquid, said vessel being connected to a source of vacuum, pipe line means for introducing liquid into said vessel to fill said vessel to a selected liquid level and for discharging processed liquia*

*from said vessel, at least one vertically extending chimney open at its bottom and top ends and centrally positioned in said vessel and extending upwardly from near the bottom of said vessel to above said liquid level, said chimney comprising a coil of hollow tubing having abutting turns, said tubing having a substantially circular cross section, means connected to said tubing at the bottom of said chimney for supplying to and circulating in heat transfer fluid through said coil at a temperature different from said liquid to said top of said chimney to effect heat transfer through the wall of said coil, at least one steam injector immersed in said liquid and discharging in said chimney to produce upward flow of liquid in said chimney, said liquid being drawn into the bottom end of said chimney and discharged from the top end of*

*said chimney, and deflecting baffle means spaced above the top end of said chimney, said baffle means being of a diameter substantially greater than said chimney and having a peripheral surface portion which extends radially outwardly beyond said chimney and is directed outwardly and downwardly to direct outwardly and downwardly liquid discharged from the top end of said chimney.*

*12. The apparatus of claim 11 including a pair of coaxial coils for circulating said heat transfer fluid therethrough.*

*13. The apparatus of claim 11 including a pair of said coils having abutting turns and separated by a gap for permitting the passage of liquid therethrough.*

* * * * *